Apr. 17, 1923.
O. P. LUETSCHER
1,452,204
SEPARATOR FOR GASEOUS FLUIDS
Filed Nov. 19, 1921
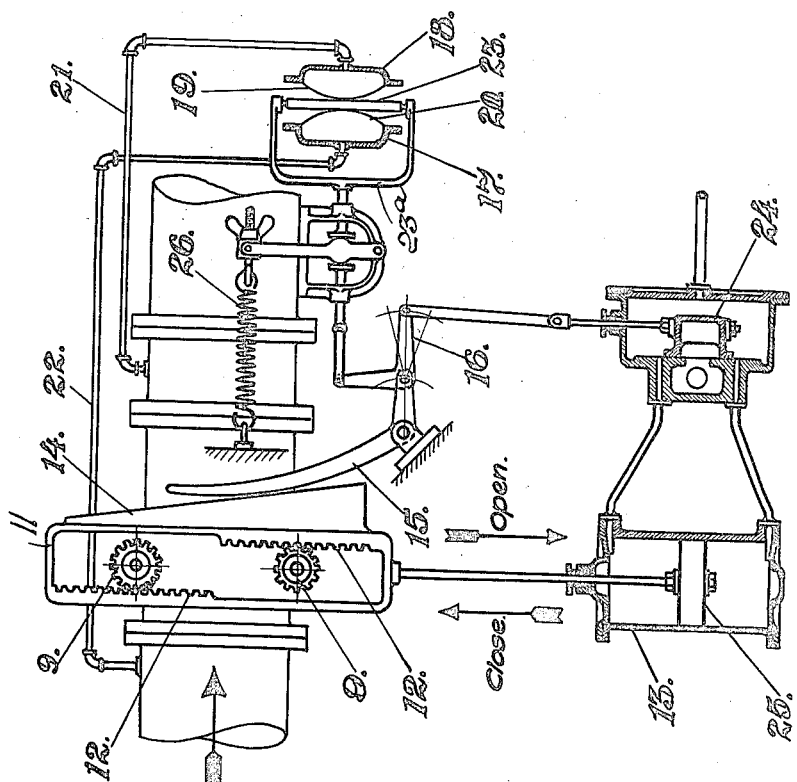
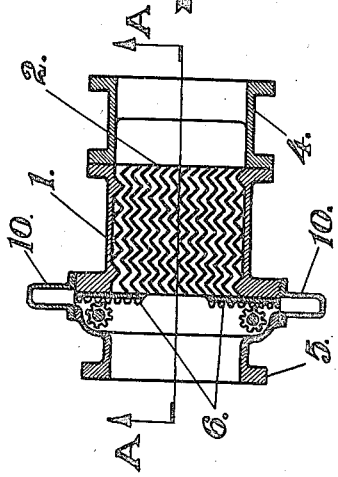
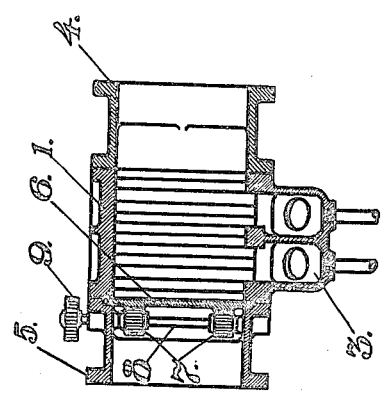
Oliver P. Luetscher
INVENTOR.
BY Dennis S. Wolcott
ATTORNEY.

Patented Apr. 17, 1923.

1,452,204

UNITED STATES PATENT OFFICE.

OLIVER P. LUETSCHER, OF PERU, ILLINOIS.

SEPARATOR FOR GASEOUS FLUIDS.

Application filed November 19, 1921. Serial No. 516,449.

*To all whom it may concern:*

Be it known that I, OLIVER P. LUETSCHER, residing at Peru, in the county of La Salle and State of Illinois, a citizen of the United States, have invented or discovered certain new and useful Improvements in Separators for Gaseous Fluids, of which improvements the following is a specification.

The invention described herein relates to apparatus for the separation from gases, vapors, etc., of particles of liquid carried thereby, the apparatus being especially adapted to the separation of particles of tar from gas. Apparatus usually employed for this purpose embodies a plurality of tortuous passages, so that the direction of the gas is diverted and caused to impinge against a surface by which the gas is again diverted and caused to impinge against another surface. It has been found that the liquid particles should have a certain rate of movement dependent on the angle which the condensing surfaces form with the direction of flow of the gas to insure the adherence of the particles of liquid to such surfaces. As the liquid collects on the surfaces the cross sectional area of the tortuous passages is reduced and the pressure drop through the apparatus thereby increased with a consequent loss of efficiency. It has been proposed to compensate for this reduction of the cross-sectional area due to the adherence of the particles to the surfaces by changing the cross-sectional areas of a part of or all of the passages.

The object of the present invention is to vary the number of passages through which the gas flows as those in use become clogged, and to automatically vary the number of passages by and in accordance with changes in the rate of flow of the gas. The invention is hereinafter more fully described and claimed.

In the accompanying drawings forming a part of this specification, Fig. 1 is a view in side elevation and in section of a separating apparatus embodying the improvements claimed herein; Fig. 2 is a sectional elevation showing the separating chamber and the condensing and collecting plates; and Fig. 3 is a sectional elevation on a plane indicated by the line A A Fig. 2.

The improved apparatus consists primarily of a shell 1 in which are a plurality of plates 2 spaced substantially equal distances apart. Adjacent surfaces of these plates are so constructed (preferably by corrugating the plates) as to form tortuous passages for the gases in order that particles of liquid carried by the gas will be caused to so impinge on the surfaces of the passage as to adhere thereto. As will be seen by reference to Figs. 2 and 3, the plates 2 are so arranged that the gases flow in a direction at right angles to the corrugations and that any liquid adhering to the plates will flow down along the corrugations into chambers 3 from which the liquid can be withdrawn through pipes. The shell 1 is provided at its ends with nozzles 4 and 5 whereby it may be connected in a conduit.

As hereinbefore stated, and as is well known, the tortuous passages will gradually become clogged up by the tarry matter adhering thereto, and as a consequence of such clogging up the pressure drop through the furnace or apparatus will be changed. For this reason the improved apparatus is constructed so as to have what might be termed supplementary passages in order that when some of the passages become clogged these supplementary passages may be opened up so as to maintain a predetermined rate of flow of the gases through the separator. In the practice of the invention described herein provision is made for preventing the flow of the gases through these supplementary passages at the beginning of the operation, and then automatically opening such passages to the flow of gases, such automatic control being effected by and in accordance with changes in the differential between the pressures at the entrance and discharge sides of the separator.

In the construction shown the two dampers 6 are arranged to move transversely of the separating plates at the inlet side thereof, said dampers being movable in opposite directions so that when supplementary passages are added such additions will be on opposite sides of the center lines thereby maintaining what might be termed a central flow of gases.

As clearly shown in Fig. 3 the meeting faces of the shell 1 and the inlet nozzle 5 of the separator are so constructed as to form guides for the edges of the dampers 6, and as the combined lengths of the dampers is greater than the width of the shell portions, they will in some positions project outside of the shell, the escape of gases along the dampers being prevented by means of hoods 10 into which the outer ends of the dampers will project as they are moved to open position. These hoods being removably secured to the separator, easy access is afforded for repair or changes as may be necessary. The under sides of the dampers are provided with a series of teeth with which pinions 7 on the shafts 8 will intermesh for the purpose of moving the dampers in and out as may be necessary. On the outer ends of these shafts are secured pinions 9 adapted to intermesh with toothed portions 12 on the yoke 11, these toothed portions being so arranged as to intermesh with one side of one pinion 9, and the other side of the other pinion so that when the yoke is reciprocated these pinions will be rotated in opposite directions causing a corresponding movement of the dampers. This yoke is connected to the piston 25 in the cylinder 13, and the flow of fluid pressure to and from this cylinder is controlled by a valve 24 as shown in Fig. 1. This valve is connected to one arm of a bell crank lever 16, the opposite arm or end of such bell crank being connected by a yoke 23ª to the disc 23. This disc 23 is arranged intermediate the shells 17 and 18 provided with flexible diaphragms 19 and 20 adapted to bear on opposite sides of the plate 23. One of these shells 17 is connected by a pipe 22 to the inlet side of the separator and the other shell 18 is connected by pipe 21 to the discharge end of the separator, so that the pressures of these respective chambers will correspond to the pressures at the inlet and outlet sides of the separating element. The rate of flow through the tortuous passages of the separating element depends upon the difference in pressure between the inlet and outlet sides, and as the rate of flow for a given angle of the surfaces of the separators to the direction of the flow must have a certain rate, a spring 26 is employed for determining this differential. This spring is arranged to so act upon the yoke 23ª as to hold the disc 23 as against movement by the pressure on the inlet side, the action of such spring being supplemented, of course, by the pressure at the outlet of the separator. By the adjustment of the tension of this spring the required differential can be established necessary to produce the desired rate of flow. As the passages become clogged, the differential would increase due to the rise of pressure on the inlet side thereby causing a movement of the disc 23 as against the contrary pressure of the spring and the diaphragm 19.

This movement of the plate 23 will, operating through the bell crank 16, shift the valve 24 so as to admit fluid pressure at the left hand end of the cylinder 13 and open the opposite end of the cylinder to the exhaust, the consequent movement of the piston 25 so operating the yoke 11 as to move the valves or dampers 6 away from each other or in such direction as to permit the flow of gases through an additional number of tortuous passages in the separator. As the yoke is shifted the cam block 14 will operate the bell crank 15 in such direction as to reverse the movement of the valve 24 to prevent further movement of the piston and yoke, and consequently of the valves or dampers, until there has been a further increase of pressure on the inlet side of the separator. It will be understood, of course, that in case there is too small a flow through the separator there will be an increase of pressure on the outlet side and the operations above described will be reversed so as to effect a closing movement of the valves or dampers, reducing the number of passages.

It is characteristic of the improvement described herein that a predetermined drop of pressure through the separator is automatically maintained by varying the number of passages through which the gases pass and in which separation of the tarry matter from the gases is effected.

I claim herein as my invention:

1. A separator for gases having in combination a shell having a plurality of tortuous passages therethrough, means movable transversely of the tortuous passage for controlling the flow of gases through the said passages, and mechanism operative by and in accordance with changes in the differential between the pressures at the inlet and outlet ends of said passages for shifting the controlling means to vary the number of passages through which the gas may flow.

2. A separator for gases having in combination a shell having a plurality of tortuous passages therethrough, valves movable transversely of the passages, means for shifting said valves, said means being operative by and in accordance with changes in the differential between the pressures at the inlet and outlet ends of the passages, and means for checking the movement of the valves after a predetermined movement thereof.

3. A separator for gases having in combination a shell having a plurality of tortuous passages therethrough, valves movable transversely of the passages, means for simultaneously moving said valves in opposite directions, and means operative by and in accordance with changes in the differential between the pressures at the inlet and outlet ends of the passages for controlling the valve operating means.

4. A separator for gases having in combination a shell having a plurality of tortuous passages therethrough, said passages having walls continuous from end to end, means for controlling the flow of gases through said passages and mechanism operative by and in accordance with changes in the differential between the pressures at the inlet and outlet ends of the passages for shifting the controlling means to vary the number of passages through which the gases may flow.

5. A separator for gases having in combination a shell having a plurality of continuous passages substantially parallel with the direction of flow of gases through the separator, means for controlling the flow of gases through said passages and mechanism operative by and in accordance with the changes in the differential between the pressures at the inlet and outlet ends of said passages for shifting the controlling means to vary the number of passages through which the gases may flow.

In testimony whereof, I have hereunto set my hand.

OLIVER P. LUETSCHER.